United States Patent
Gabas et al.

[11] Patent Number: 6,038,942
[45] Date of Patent: Mar. 21, 2000

[54] MANUALLY ADJUSTED DEVICE FOR CONTROL CABLE TERMINALS

[75] Inventors: Carlos Gabas; Jordi Casas, both of Barcelona, Spain

[73] Assignee: Fico Cables, S.A., Barcelona, Spain

[21] Appl. No.: 08/930,872

[22] PCT Filed: Mar. 11, 1997

[86] PCT No.: PCT/ES97/00057

§ 371 Date: Oct. 8, 1997

§ 102(e) Date: Oct. 8, 1997

[87] PCT Pub. No.: WO97/35118

PCT Pub. Date: Sep. 25, 1997

[30] Foreign Application Priority Data

Mar. 15, 1996 [ES] Spain ........................................ 9600634

[51] Int. Cl.[7] ........................................................ F16C 1/10
[52] U.S. Cl. ...................................... 74/500.5; 192/111 R
[58] Field of Search ........................... 74/501.5 R, 500.5,
74/502.4, 502.6; 192/111 R, 111 A; 403/104,
406, 110

[56] References Cited

U.S. PATENT DOCUMENTS 1,611,057  12/1926  Neil .......................................... 403/104
5,299,469   4/1994  Meyer et al. ............................. 403/104
5,570,612  11/1996  Reasoner .......................... 74/501.5 R X

*Primary Examiner*—David A. Bucci
*Assistant Examiner*—Colby Hansen
*Attorney, Agent, or Firm*—Michael J. STriker

[57] ABSTRACT

A manually adjusted device for terminals of control cables having a longitudinal housing provided on a main body of a terminal and open at one end, a regulating rod which is slideable in both directions, and having an interior end and an exterior end, the regulating rod being linked to the longitudinal housing by the interior end so that the exterior end projects outwardly of the main body, device for securing a position of the regulating rod with respect to the terminal, thrust device including at least one thrust spring which works permanently under compression with one end resting against the interior end of the regulating rod and another end resting against the main body so that the regulating rod is permanently subjected to an action of a force directed from outside inwards, and a longitudinal housing in which the thrust spring is fitted, the longitudinal housing in which the thrust spring is fitted extending parallel to the longitudinal housing of the regulating rod and being linked by a guide groove, and a transverse thrust extension which traverses the guide groove and interacts with the thrust spring.

9 Claims, 4 Drawing Sheets

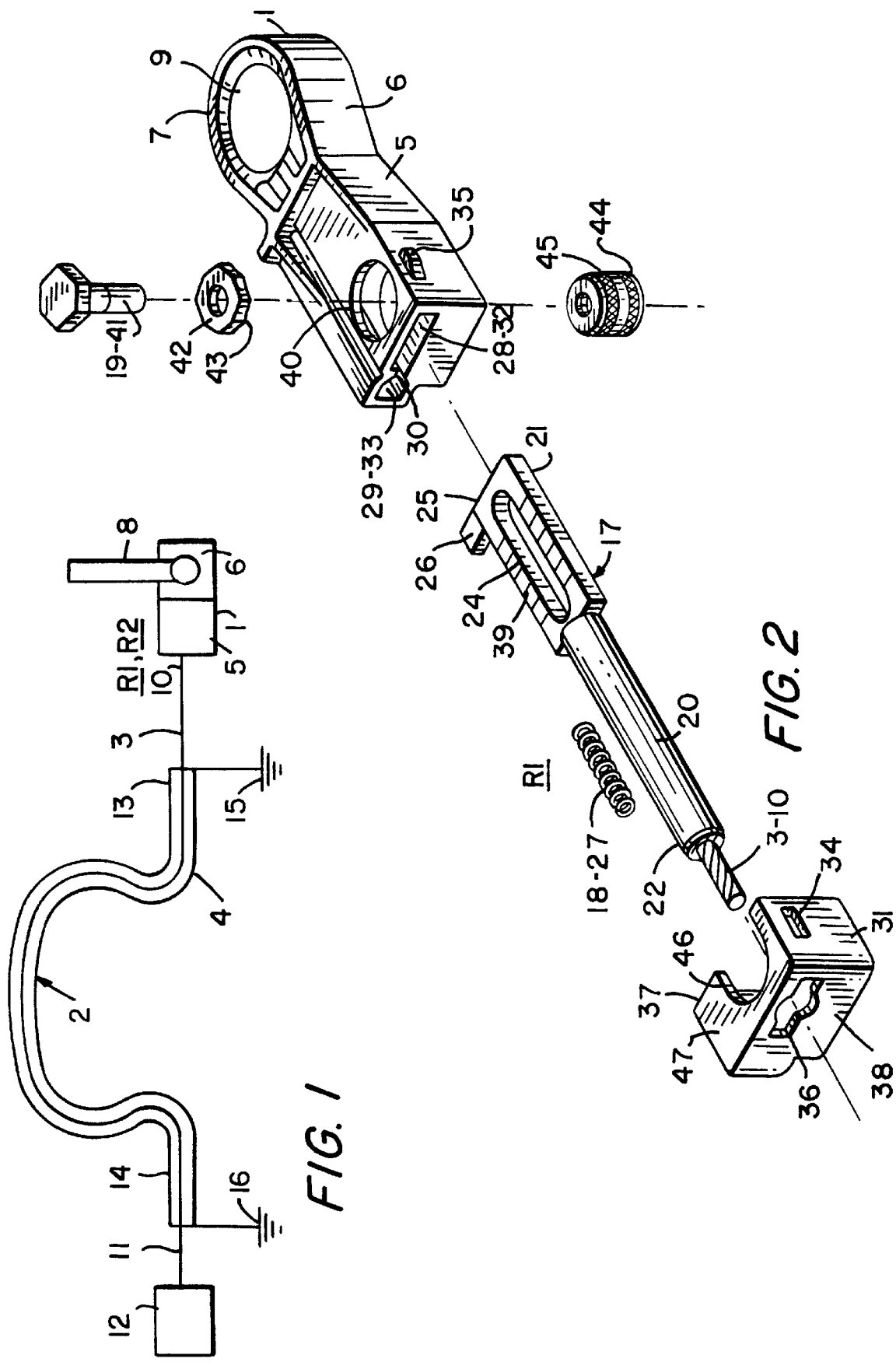

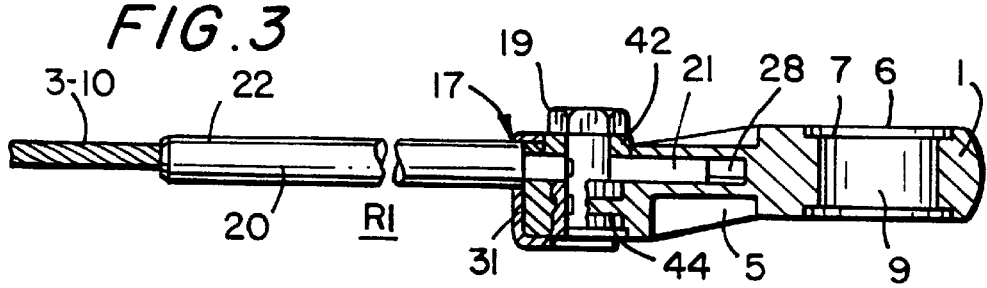
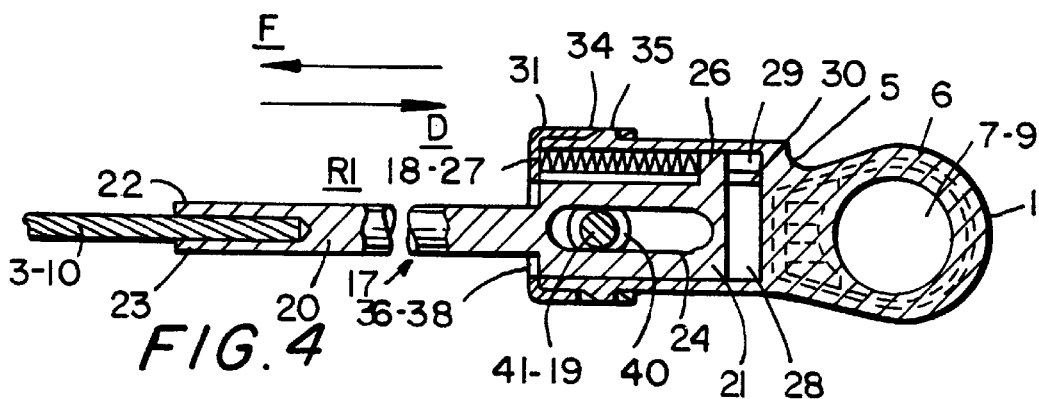

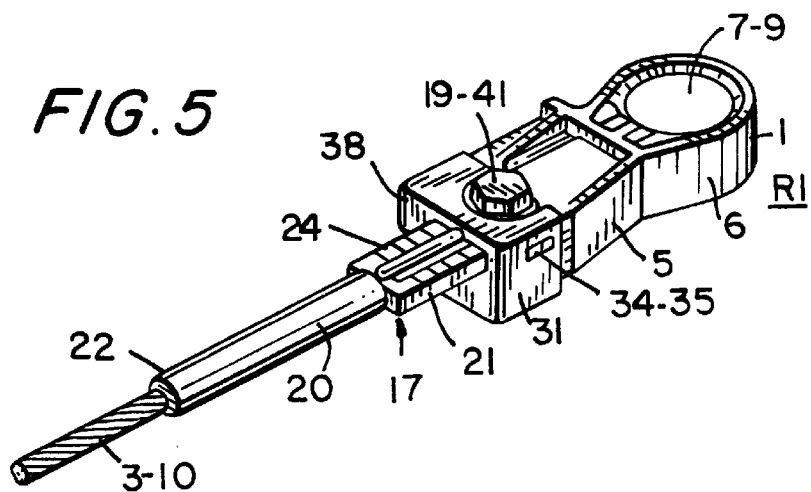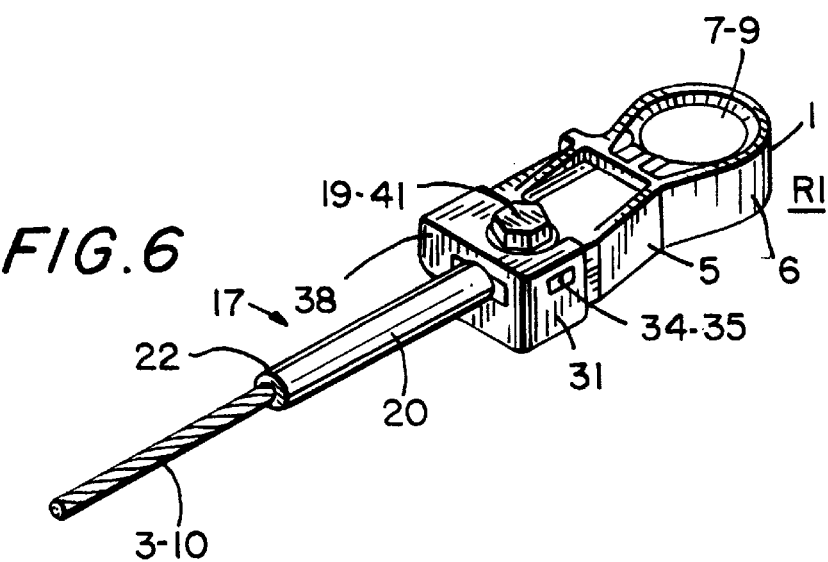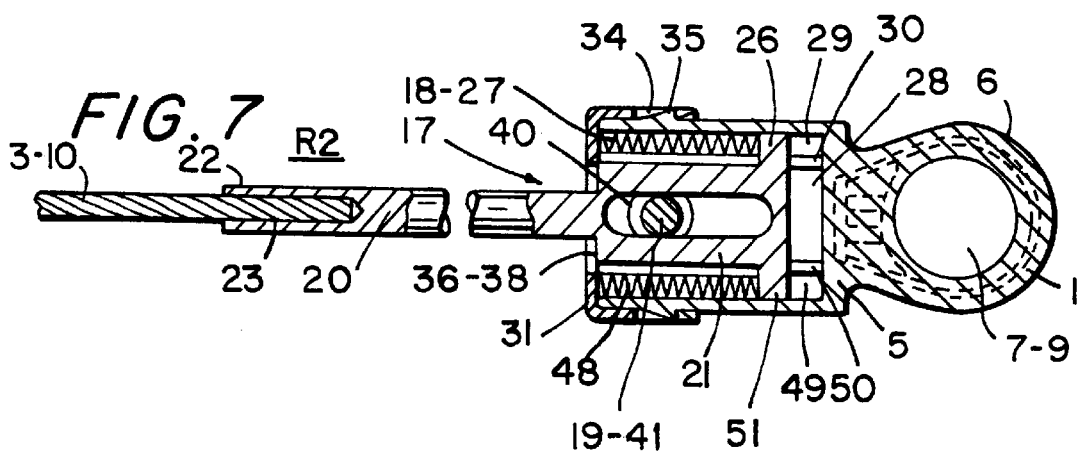

MANUALLY ADJUSTED DEVICE FOR CONTROL CABLE TERMINALS

TECHNICAL FIELD OF THE INVENTION

The object of the present invention is a self-adjusting device for control cable terminals, which is generally applicable to thrust-traction control cable terminals, usually known as push-pull operating cables, which, made up of a sheathed steel cable, are extensively used in the automobile industry. In particular, the self-adjusting device for control cable terminals of the invention is applicable to control cables of the type used as means of linkage between the gear-change mechanism and its operating shift lever.

BACKGROUND OF THE INVENTION

In general, the known embodiments of thrust-traction control cables used in the automobile industry comprise a sheathed steel cable both ends of which are provided with a terminal adapted to each specific case of application. Amongst the various types of control cable known in the art, a type commonly found is a control cable which links the gear-change mechanism with its operating shift lever. Essentially this comprises of a steel cable provided at both ends with corresponding terminals, and a sheath which partially covers the steel cable and has both ends attached to the respective fixed points of the vehicle structure provided along the route of the control cable, so that the control cable terminal corresponding to the shift-lever side, once coupled to that lever, forms an articulation which permits transmission of the thrust-traction forces applied on the operating shift lever. As an example of an articulation formed by coupling of the control cable with the shift lever there is the ball or ball-joint type, in which the control cable terminal comprises a ball-joint shell into which there fits with a tight fit a ball attached to a shift lever.

Once the control cable has been fitted on the vehicle, that is, once the control cable terminals have been coupled to the gear-change mechanism and to the shift lever and the ends of the steel cable sheath have been attached to corresponding fixed points, the sheathed portion of the steel cable has to be adjusted in order to achieve suitable functioning of the control cable by taking up the length tolerances which may be found on any particular vehicle.

In general, adjustment of the length of the sheathed portion of the steel cable of the control cable is implemented by means of an adjusting device fitted to one of the terminals of the control cable. The known embodiments of such adjusting devices essentially include a rod attached axially by one of its ends to the corresponding end of the steel cable, a housing on the terminal designed to receive the rod in such a way that the latter can slide in both directions, and means to fix the position of the rod with respect to the terminal once the length of the sheathed steel cable portion has been adjusted, which means essentially consist of a bolt which can be tightened down.

The known embodiments of adjusting devices such as those described above work in the way described below. The control cable is supplied ex-works with the rod of the adjusting device fixed to the terminal by means of said tighten-down bolt, and in such a way that the rod projects with respect to the terminal, that is, the control cable is supplied ex-works at its maximum length. Once the control cable has been fitted onto the vehicle, the length of the sheathed portion of the steel cable is adjusted by carrying out the following operations: first, the rod of the adjusting device must be released so that the rod can slide; a force is then applied manually to the rod in the direction corresponding to the direction of insertion of the rod into its housing on the terminal; and finally, keeping said force applied, the new position of the rod is fixed by means of the said tighten-down bolt.

The above-described functioning of the known embodiments of adjusting devices presents the following disadvantages. Firstly, adjustment of the length of the sheathed portion of the steel cable of the control cable is a function of the force applied manually on the rod, which leads to adjustments differing from one person to another or even according to the force applied in each case by one person. Secondly, the operations to fix the position of the rod, which are implemented by keeping a force applied manually on the rod, present difficulties which have an adverse effect on achieving the optimum degree of adjustment. Finally, another disadvantage is that the time needed to carry out the adjustment operation is relatively long and increases assembly costs.

SUMMARY OF THE INVENTION

A self-adjusting device for control cable terminals of a new structure and function is made known hereby in order to provide a solution to the above-described problems presented by the known embodiments of adjusting devices which adjust the length of the sheathed portion of steel cable of control cables.

The self-adjusting device for control cables of the invention is applicable to thrust-traction control cable terminals made up essentially of a sheathed steel cable, which terminals essentially consist in a main body on which are mounted linkage means which can be coupled to an actuating control or to its associated mechanism. The self-adjusting device of the invention includes on the main body of the terminal a longitudinal housing open at one of its ends, upon which is fitted a regulating rod which can slide in both directions and is linked by one of its ends, the exterior end which projects from the main body, to the corresponding end of the steel cable, and means which secure the position of the adjusting rod with respect to the terminal.

The self-adjusting device of the invention is characterized in that the interior of the main body is provided with thrust means which comprise at least one thrust spring which works permanently under compression with one of its ends resting against the interior end of the regulating rod and its other end against the main body, in such a way that the regulating rod is permanently subjected to the action of a force directed from the outside inwards.

According to one mode of embodiment, the thrust means are characterized in that they comprise the following parts: a thrust spring; a longitudinal housing in which the thrust spring is fitted, the housing being arranged parallel to the housing of the regulating rod and open at its end which corresponds with the open end of the regulating rod housing, with both housings, that of the regulating rod and that of the thrust spring, being linked transversally over their entire lengths by means of a guide-groove which runs from the open end of both housings; a closing cover which can be coupled to the main body by means of respective and complementary securing means, which closing cover includes a through-orifice through which the regulating rod can slide in both directions; and, on the interior end of the regulating rod, a transverse thrust extension which traverses the guide-groove to fit into the housing of the thrust spring, with all so designed that one end of the thrust spring rests permanently against the closing cover and the other end against the transverse thrust extension of the regulating rod.

According to another mode of embodiment, the thrust means are characterized in that they comprise the following parts: two thrust springs; two longitudinal housings each fitted with a thrust spring, the housings being arranged parallel to the housing of the regulating rod and open at their ends which correspond with the open end of the regulating rod housing, with each of the housings of the thrust springs being linked transversally over its entire length with the housing of the regulating rod by means of a respective guide-groove which runs from the open ends of the corresponding housings; a closing cover which can be coupled to the main body by means of respective and complementary securing means, which closing cover includes a through-orifice through which the regulating rod can slide in both directions; and, on the interior end of the regulating rod, two transverse thrust extensions which traverse a corresponding guide-groove to fit into the housings of the thrust springs, with all so designed that one end of each of the thrust springs rests permanently against the closing cover and the other end against the transversal thrust extension of the regulating rod.

According to another characteristic of the self-adjusting device of the invention, the means which fix the position of the regulating rod comprise the following parts: a retaining through-orifice which traverses perpendicularly the housing of the regulating rod; on the regulating rod, a retaining portion of essentially parallelepiped shape on which there is a securing through-groove running axially and superimposed on the retaining orifice, the retaining portion having securing teeth; a retaining bolt, a retaining washer and a retaining nut, on which the retaining washer has securing teeth which match the securing teeth of the retaining portion, the securing nut is included on the main body coaxially aligned with respect to the retaining through-orifice, and the securing nut and bolt can be coupled together by screwing, with all so designed that screwing of the retaining bolt into the retaining nut is implemented by traversing the securing through-groove, leaving the retaining washer mounted between the retaining bolt and the retaining portion with their respective securing teeth facing each other and able to engage with each other.

The functioning of the self-adjusting device for control cable terminals of the invention is now described. The self-adjusting device of the invention is supplied ex-works with the thrust spring(s) expanded, that is, with the regulating rod fixed in its interior-most position with respect to the main body of the terminal, in which position the control cable is at its minimum length. Under these conditions, in order to fit the control cable on the vehicle the following operations must be carried out: first, the regulating rod is released by unscrewing the retaining bolt; the ends of the control cable sheath are then attached to corresponding fixed points and at the terminal of the end of the control cable opposite the end which has the self-adjusting device of the invention to the corresponding associated mechanism; the terminal provided with the self-adjusting device of the invention is then attached to the actuating control, for which purpose a force must be applied to subject the thrust spring (s) to greater compression by reducing their length, that is, by increasing the portion of the regulating rod which projects from the main body and increasing the length of the control cable by the same amount; once the terminal has been attached to the actuating control, and application of the aforesaid force has ceased, the action of the thrust spring(s) pushes the regulating rod towards the interior of the main body, that is, from outside inwards, moving in so far as the elastic reaction of the thrust spring(s) and the opposite action exercised by the sheathed portion of the control cable cancel each other out; finally, once the movement of the regulating rod under the driving force of the thrust spring(s) has ceased, that is, when the length of the control cable has been adjusted, the position of the regulating rod is fixed by screwing the retaining bolt into the retaining nut, in such a way that the securing teeth of the retaining washer and of the interior portion of the regulating rod are mutually intermeshed, leaving the regulating rod attached to the main body of the terminal.

The characteristics of the self-adjusting device for control cables of the invention provide an innovative solution to the above-mentioned disadvantages presented by the known embodiments of self-adjusting devices for control cables. Indeed, the above-described functioning of the self-adjusting device of the invention permits, on the one hand, the results obtained in adjusting the length of the sheathed portion of the steel cable of the control cable to be practically constant, that is, there is no scattering of results in respect of said adjustment, unlike with the known embodiments of adjusting devices operated manually, while on the other hand, the ease of use of the self-adjusting device of the invention very markedly reduces the time spent adjusting the length of the control cable, thereby reducing the costs of fitting same to the vehicle.

BRIEF DESCRIPTION OF THE DRAWINGS

The drawing sheets of the present specification show the self-adjusting device for control cables of the invention. In said drawings:

FIG. 1 is a schematic view of a control cable having the self-adjusting device of the invention and linking the actuating control with its associated mechanism;

FIG. 2 is a perspective view of the parts making up a mode of embodiment of the self-adjusting device of the invention;

FIG. 3 is a side-section view of the mode of embodiment of the self-adjusting device of the invention shown in FIG. 2

FIG. 4 is a sectioned plan view of the mode of embodiment of the self-adjusting device of the invention shown in FIG. 2;

FIG. 5 is a perspective view of the mode of embodiment of the self-adjusting device of the invention shown in FIG. 2, once the length of the control cable has been adjusted;

FIG. 6 perspective view of the mode of embodiment of the self-adjusting device of the invention shown in FIG. 2 as it is supplied ex-works;

FIG. 7 a sectioned plan view of another mode of embodiment of the self-adjusting device of the invention.

DETAILED DESCRIPTION OF THE PREFERRED EMBODIMENT

Figure 8:
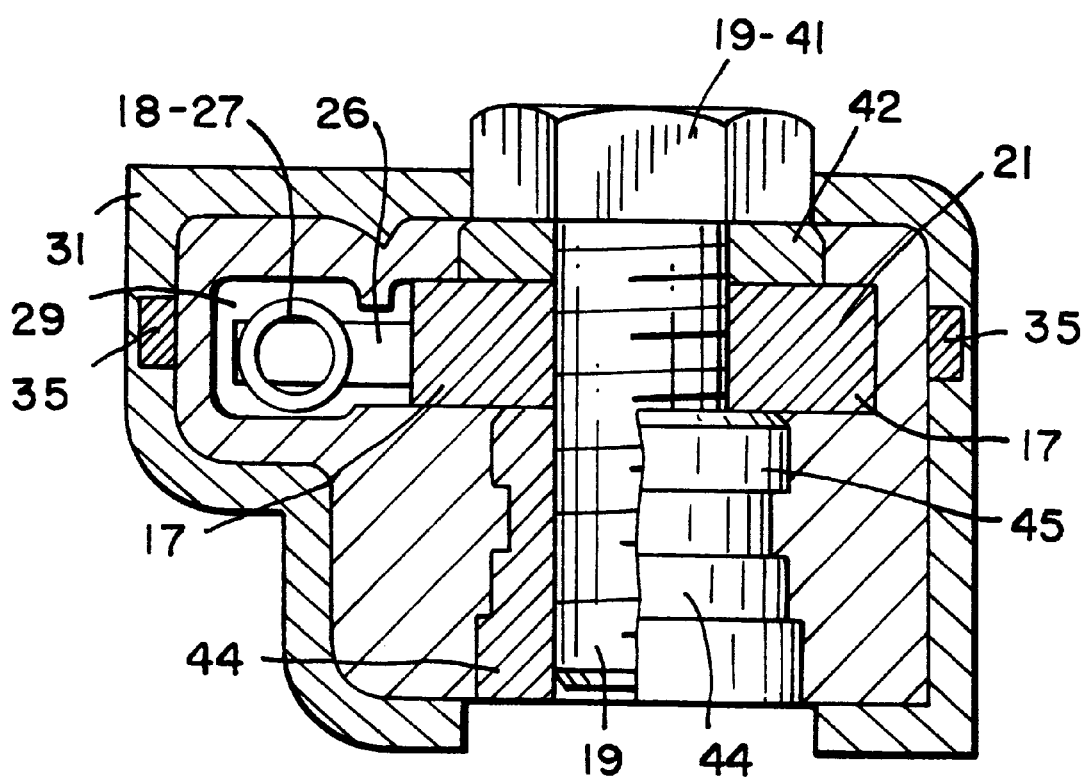
FIG. 8 is a cross-section showing an engagement of retaining portion teeth with respect to securing teeth of a retaining washer of the inventive self-adjusting device.

FIGS. 2 to 7 of the drawing sheets show two different modes of embodiment of the self-adjusting device for control cables of the invention, which modes of embodiment are designated with references R1 and R2, respectively; FIGS. 2 to 6 show a first mode of embodiment R1, while FIG. 7 shows a second mode of embodiment R2. Both modes of embodiment, R1 and R2, share common parts, so that in the description thereof such parts are designated by the same reference numbers.

FIG. 1 shows schematically how both modes of embodiment R1, R2 of the self-adjusting device of the invention are applicable to a terminal 1 of a control cable 2 made up essentially of a steel cable 3 provided with a sheath 4. FIGS. 2 to 6 show how the terminal 1 is of generally long prismatic configuration including, longitudinally, a main body 5 and a coupling extension 6 provided with linkage means 7 designed for coupling the terminal 1 to an actuating control 8 shown schematically in FIG. 1. It is understood that both the main body 5 and the coupling extension 6 and its linkage means 7, which in this example of application essentially comprise a transverse through-orifice 9, can adopt any other configuration suited to each specific case of application, without this affecting the essential nature of the invention; thus, for example, the linkage means 7 can consist of a spherical housing to take a ball attached to the actuating control 8. FIG. 1 shows how the terminal 1 is mounted on one end 10 of the steel cable 3, while the other end 11 of the steel cable 3 is attached to a gear-shift mechanism 12 shown schematically using linkage means which are not depicted, the ends 13, 14 of the control cable 2 sheath 4 being firmly attached to respective fixed points 15, 16 of the structure of the automobile vehicle.

The description which follows refers to mode of embodiment R1 of the self-adjusting device of the invention, which device R1 comprises a regulating rod 17, thrust means 18 and securing means 19, all of which are shown separately in perspective view in FIG. 2.

FIGS. 2 to 5 show how, longitudinally, the regulating rod 17 has two portions: a cylindrical portion 20 which, as shown in FIGS. 3 to 6, projects at all times from the main body 5; and a retaining portion 21, which as shown in said FIGS. 3 to 6, is at all times totally or partially fitted in a longitudinal housing 28 with an open end 32, as shown in FIG. 2, of the main body 5. FIG. 4 shows how the exterior end 22 of the cylindrical portion 20 has a coaxial orifice 23 designed to take and secure the end 10 of the steel cable 3, while the retaining portion 21 is essentially parallelepiped in shape and forms the retaining means 19.

FIGS. 2 and 4 show how the thrust means 18 comprise: a thrust spring 27; a longitudinal housing 29 open at its end 33 and containing the thrust spring 27, which housing 29 is situated parallel to the housing 28 of the regulating rod 17; a guide-groove 30 which links over their entire length the housings 28, 29 of the regulating rod 17 and the thrust spring 27, respectively; at the interior end 25 of the regulating rod 17, a transverse extension 26 which traverses the guide-groove 30 and is fitted in the housing 29 of the thrust spring 27; and a closing cover 31 of generally hollow prismatic shape open on one of its sides, the front side marked with reference number 37 in FIG. 2, which can be coupled to the main body 5 by means of through-openings 34 and retaining lugs 35 with which they are respectively and further provided, the closing cover 31 having at its back 38, which is the side opposite the open side, a through-orifice 36 whose outline corresponds with the cross sections of the retaining 21 and cylindrical 20 portions of the regulating rod 17, so that the rod 17 can slide through it with a tight fit. As shown in FIG. 4, the thrust means 18 are designed so that, once the retaining portion 21 of the regulating rod 17 is situated in its housing 28, the thrust spring 27 is situated in its housing 29 and the closing cover 31 has been coupled to the main body 5, the thrust spring 27 is left working permanently under compression with one of its ends resting against the transverse thrust extension 26 of the regulating rod 17 and its other end against the back 38 of the closing cover 31. With this arrangement of the thrust means 18, the regulating rod 17 can slide in both directions marked D and F in FIG. 4. In the direction marked F, travel of the regulating rod 17 subjects the thrust spring 27 to greater compression due to the action of its transverse thrust extension 26, which slides along the guide-groove 30, with FIG. 5 showing the position of the regulating rod 17 in which the thrust spring 27 is subjected to greater compression. And in the direction marked D, the regulating rod 17 is moved by elastic reaction of the thrust spring 27, with FIGS. 3, 4 and 6 showing the position of the regulating rod 17 at which it is situated furthest inside the main body 5.

FIGS. 2, 3 and 4 show how the retaining means 19 comprise, on the retaining portion 21 of the regulating rod 17, a securing through-groove 24 running axially and securing teeth 39; in the main body 5, a retaining through-orifice 40 which, traversing the housing 28 of the regulating rod 17 perpendicularly, is arranged to match the securing groove 24; a retaining bolt 41; a retaining washer 42 provided with securing teeth 43 to match the securing teeth 39 of the retaining portion 21 of the regulating rod 17; and a retaining nut 44 with lateral knurling 45, as shown in FIG. 3, on the main body 5, with the retaining nut 44 coaxially fitted with respect to the retaining orifice 40, while the retaining nut 44 and retaining bolt 41 can be coupled together by screwing. As shown in FIGS. 3 and 4, the retaining means 19 are designed so that screwing of the retaining bolt 41 into the retaining nut 44 is implemented by the retaining bolt 41 traversing a recess 46 made on a corresponding lateral side 47 of the closing cover 31, as shown in FIG. 2, the retaining orifice 40 of the main body 5 and the retaining groove 24 of the retaining portion 21, leaving the retaining washer 42 between the retaining bolt 41 and the retaining portion 21 with its securing teeth 43 facing the securing teeth 39 of the retaining portion 21. With this arrangement of the retaining means 19, screwing or unscrewing the retaining bolt 41 along the thread leads to securing or releasing, respectively, the position of the regulating rod 17. The screwing of the retaining bolt 41 causes coupling or meshing of the securing teeth 43 and 39 of the retaining washer 42 and of the retaining portion 21, respectively, thereby preventing movement of the regulating rod 17. And, with the retaining teeth 43 and 39 meshed, unscrewing the retaining bolt 41 leads to the opposite effect, that is, to disengagement of the securing teeth 43 and 39 so that the regulating rod 17 can move in both directions.

The mode of embodiment R2 of the invention shown in FIG. 7 differs from the mode of embodiment R1 described above in that it includes an additional thrust spring 48, which is fitted in a housing 49 which links with the housing 28 of the regulating rod 17 by means of a guide-groove 50 which is traversed by a thrust extension 51 mounted on the interior end 25 of the regulating rod 17. FIG. 7 shows how said additional thrust spring 48 and other thrust means 49, 50 and 51 are mounted symmetrically with respect to the thrust means 18 of mode of embodiment R1. It can be understood that both modes of embodiment R1 and R2 of the self-adjusting device of the invention differ from each other basically due to mode of embodiment R2 having the thrust spring 48, which serves the purpose of applying an additional force on the regulating rod 17 in the direction marked D in FIG. 4.

There follows a description of the functioning of mode of embodiment R1 of the self-adjusting device for terminals of control cables of the invention, all of which description is also applicable to mode of embodiment R2. FIG. 6 shows how the self-adjusting device of the invention is supplied ex-works; in this condition, the regulating rod 17 projects very slightly from the main body 5 of the terminal 1 and the thrust spring 27 is expanded, with the position of the regulating rod 17 being fixed by meshing of the securing teeth 43, 39 of the retaining washer 42 and of the retaining portion 21 of the regulating rod 17, respectively, this meshing being ensured in turn by the tightening action of the retaining bolt 41 screwed into the retaining nut 44 included in the main body 5. With this arrangement of parts, and once the ends 13 and 14 of the sheath 4 have been fixed to corresponding fixed points 15 and 16 and the end 11 of the steel cable 3 attached to the gear-shift mechanism 12, in order to adjust the length of the control cable 2 the user has to carry out the following operations: first, unscrew the retaining bolt 41, thereby allowing the regulating rod 17 to move in both directions D and F; a force has then to applied upon the main body 5 in the direction marked D so that, by overcoming the elastic reaction of the thrust spring 27, the regulating rod 17 moves in the direction marked F and the coupling extension 6 can be attached to the actuating control 8; once the coupling extension 6 has been attached to the actuating control 8 and the force applied by the user has ceased, the elastic reaction of the thrust spring 27 leads to movement of the regulating rod 17 in the direction marked D, and that movement will continue until the elastic reaction of the thrust spring 27 equals the reaction in the opposite direction produced by the sheathed portion of steel cable 3, at which moment the length of said sheathed portion 3, 4 is adjusted; finally, in order to fix the position reached by the regulating rod 17, the user has simply to thread the retaining bolt 41 into the nut 44, causing meshing of the retaining teeth 43 and 39 and thereby leaving the control cable 2 in the envisaged service condition.

What is claimed is:

1. A manually adjusted device for terminals of control cables, comprising a longitudinal housing provided on a main body of a terminal and open at one end; a regulating rod which is slideable in both directions and having an interior end and an exterior end, said regulating rod being linked to said longitudinal housing by said interior end so that said exterior end projects outwardly of the main body; means for securing a position of said regulating rod with respect to the terminal; thrust means including at least one thrust spring which works permanently under compression with one end resting against said interior end of said regulating rod and another end resting against the main body so that said regulating rod is permanently subjected to an action of a force directed from outside inwards; and a longitudinal housing in which said thrust spring is fitted, said longitudinal housing in which said thrust spring is fitted extending parallel to said longitudinal housing of which said regulating rod is fitted and being linked with said longitude housing of said regulating rod by a guide groove; and a transverse thrust extension which traverses said guide groove and interacts with said thrust spring.

2. A manually adjusted device as defined in claim 1, wherein said thrust spring rests permanently against said transverse thrust extension.

3. A manually adjusted device as defined in claim 2; and further comprising a closing cover which is coupled to the main body, said thrust spring having one end which rests permanently against said closing cover and another end which rests against said transverse thrust extension.

4. A manually adjusted device as defined in claim 3, wherein said closing cover has a through orifice through which said regulating rod is slideable in both directions.

5. A manually adjusted device as defined in claim 1, wherein said housings have open ends, said guide groove running from said open ends of said housings.

6. A manually adjusted device as defined in claim 1; and further comprising a second such thrust spring, and a second such longitudinal housing in which said second thrust spring is located, said second longitudinal housing being linked transversely by a second guide groove with said longitudinal housing of said regulating rod.

7. A manually adjusted device as defined in claim 6, wherein said regulating rod has a second transverse thrust extension traversing said second guide groove; and a closing cover adapted to be coupled to the main body, said thrust springs being arranged so that one end of said springs resting permanently against said closing cover while the other end of each of said thrust springs rests against a respective one of said transverse thrust extensions.

8. A manually adjusted device as defined in claim 1, wherein said means for securing the position of said regulating rod include a retaining through orifice which traverses perpendicularly said housing of said regulating rod, a retaining portion provided on said regulating rod and having a through groove superimposed on said retaining orifice and securing teeth, a retaining bolt, a retaining washer, and a retaining nut ,said retaining being washer provided with securing teeth matching said securing teeth of said retaining portion, formed so that screwing of said retaining bolt into said retaining nut is implemented by traversing said securing through groove, and leaving said retaining washer mounted between said retaining bolt and said retaining portion, with said securing teeth of said retaining washer and said securing teeth of said retaining portion facing and engageable with each other.

9. A manually adjusted device for terminals of control cables, comprising a longitudinal housing provided on a main body of a terminal and open at one end; a regulating rod which is slideable in both directions and having an interior end and an exterior end, said regulating rod being linked to said longitudinal housing by said interior end so that said exterior end projects outwardly of the main body; means for securing a position of said regulating rod with respect to the terminal; thrust means including at least one thrust spring which works permanently under compression with one end resting against said interior end of said regulating rod and another end resting against the main body so that said regulating rod is permanently subjected to an action of a force directed from outside inwards; and a longitudinal housing in which said thrust spring is fitted, said longitudinal housing of said regulating rod and said longitudinal housing of said thrust spring being formed as two separate housings.

* * * * *